United States Patent
Lee et al.

(10) Patent No.: US 10,458,357 B2
(45) Date of Patent: Oct. 29, 2019

(54) METHOD FOR DIAGNOSING AND CONTROLLING TWO-STEP EXHAUST VARIABLE VALVE LIFT SYSTEM AND VEHICLE PROVIDED WITH THE SAME METHOD

(71) Applicant: Hyundai Motor Company, Seoul (KR)

(72) Inventors: JangSu Lee, Yongin-si (KR); Seungcheol Han, Cheongju-si (KR)

(73) Assignee: Hyundai Motor Company, Seoul (KR)

( * ) Notice: Subject to any disclaimer, the term of this patent is extended or adjusted under 35 U.S.C. 154(b) by 144 days.

(21) Appl. No.: 15/376,483

(22) Filed: Dec. 12, 2016

(65) Prior Publication Data

US 2018/0058360 A1    Mar. 1, 2018

(30) Foreign Application Priority Data

Aug. 23, 2016 (KR) .................. 10-2016-0107051

(51) Int. Cl.
| | |
|---|---|
| *F02D 41/22* | (2006.01) |
| *F01L 13/00* | (2006.01) |
| *F02D 11/02* | (2006.01) |
| *F02M 35/10* | (2006.01) |
| *F02D 13/02* | (2006.01) |

(Continued)

(52) U.S. Cl.
CPC ........ *F02D 41/221* (2013.01); *F01L 13/0005* (2013.01); *F02D 11/02* (2013.01); *F02D 13/0246* (2013.01); *F02D 41/1481* (2013.01); *F02D 41/18* (2013.01); *F02M 35/10386* (2013.01); *F02D 41/0055* (2013.01); *F02D 41/123* (2013.01); *F02D 2041/001* (2013.01);

(Continued)

(58) Field of Classification Search
CPC ...... F02D 11/02; F02D 41/18; F02D 41/1481; F02D 13/0246; F02D 41/0055; F02D 2200/501; F02D 2200/04; F02D 41/123; F02D 2041/001; F02M 35/10386; F01L 2001/186; F01L 2201/00; F01L 13/0005; F01L 2800/11; F01L 2820/04
See application file for complete search history.

(56) References Cited

FOREIGN PATENT DOCUMENTS

| JP | 08-326516 A | 12/1996 |
|---|---|---|
| JP | 2004-068617 A | 3/2004 |

(Continued)

*Primary Examiner* — Mark A Laurenzi
*Assistant Examiner* — Wesley G Harris
(74) *Attorney, Agent, or Firm* — Morgan, Lewis & Bockius LLP

(57) ABSTRACT

Disclosed herein is a method for diagnosing and controlling a two-step exhaust variable valve lift (VVL) system, including: a controlling device acquiring an operation state signal of a vehicle; when the vehicle is in the over-run state, the controlling device outputting a mode conversion signal of the two-step exhaust VVL system; an air mass sensor measuring an air mass entering an engine, and the controlling device comparing a predetermined prediction value of the air mass with the measured air mass; when a difference of the compared air mass corresponds to a predetermined mode conversion comparing amount, the controlling device determining that a mode conversion of the two-step exhaust VVL system is completed; and when the difference of the compared air mass does not correspond to the mode conversion comparing amount, the controlling device determining that the two-step exhaust VVL system is faulty and outputting a result thereof.

9 Claims, 4 Drawing Sheets

(51) Int. Cl.
  *F02D 41/14* (2006.01)
  *F02D 41/18* (2006.01)
  F02D 41/12 (2006.01)
  F02D 41/00 (2006.01)
(52) U.S. Cl.
  CPC .... *F02D 2200/04* (2013.01); *F02D 2200/501* (2013.01); *Y02T 10/40* (2013.01)

(56) References Cited

FOREIGN PATENT DOCUMENTS

| | | |
|---|---|---|
| JP | 2015-021395 A | 2/2015 |
| JP | 2015-135065 A | 7/2015 |
| JP | 6107678 B2 | 4/2017 |
| KR | 10-2015-0058794 A | 5/2015 |

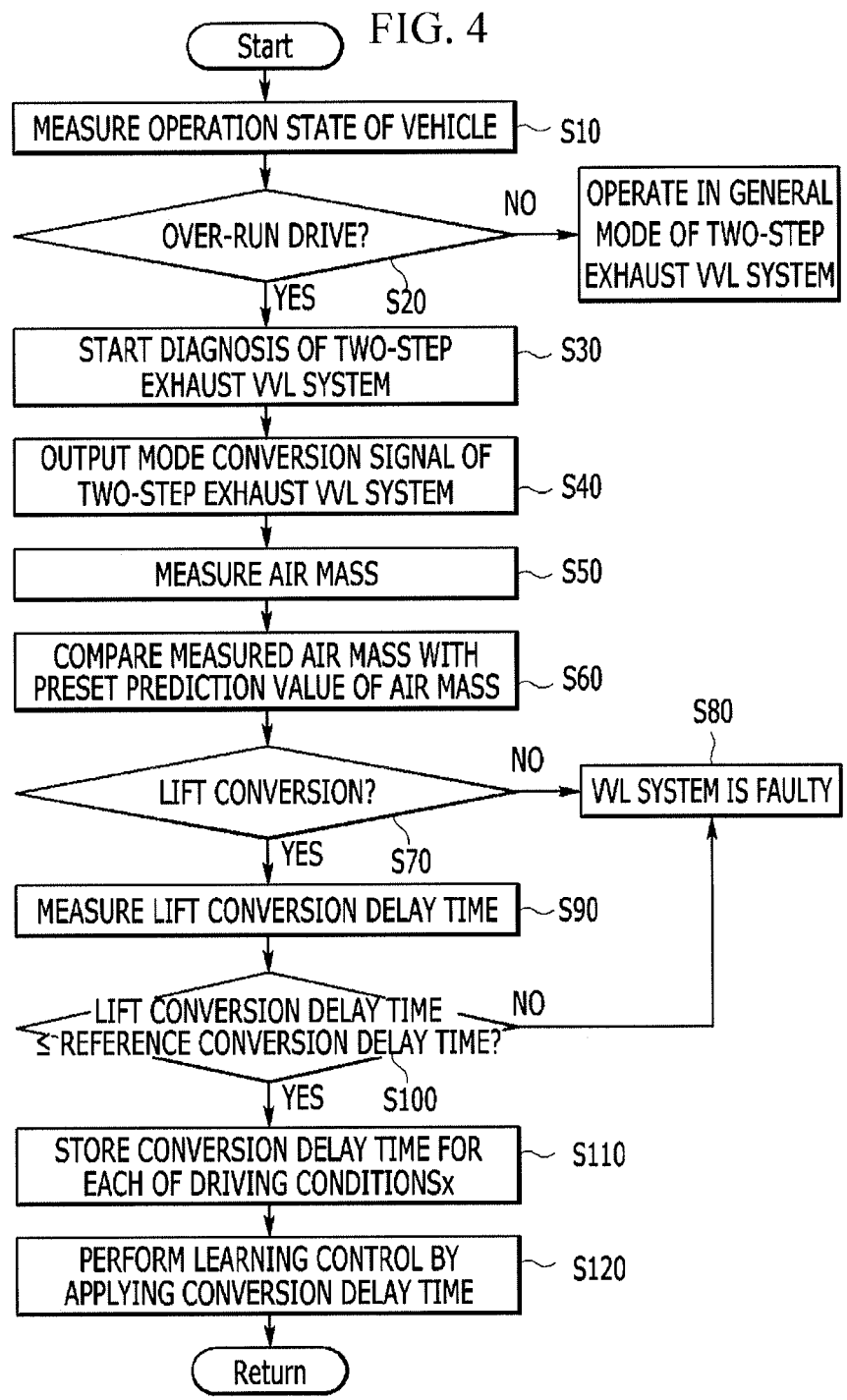

METHOD FOR DIAGNOSING AND
CONTROLLING TWO-STEP EXHAUST
VARIABLE VALVE LIFT SYSTEM AND
VEHICLE PROVIDED WITH THE SAME
METHOD

CROSS-REFERENCE TO RELATED
APPLICATION

The present application claims priority to Korean Patent Application No. 10-2016-0107051 filed on Aug. 23, 2016, the entire contents of which is incorporated herein for all purposes by this reference.

BACKGROUND OF THE INVENTION

Field of the Invention

Various embodiments of the present invention relates to a method for diagnosing and controlling a two-step exhaust variable valve lift (VVL) system and a vehicle provided with the same method, and more particularly, to a method for determining whether or not a two-step exhaust VVL system is faulty and controlling the two-step exhaust VVL system, and a vehicle provided with the same method.

Description of Related Art

A valve lift conversion in a two-step exhaust variable valve lift (VVL) system mainly uses a two-step variable roller finger follower (RFF) system which is controlled by oil pressure.

However, in the case of a two-step based VVL system which is controlled by oil, it is currently impossible to accurately measure whether or not a valve lift is converted.

That is, in the case in which the valve lift of the two-step exhaust VVL system is not converted or the conversion thereof is delayed, a large amount of harmful exhaust gas may occur by an incomplete combustion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for determining whether or not a two-step exhaust VVL system is faulty and controlling the two-step exhaust VVL system, and a vehicle provided with the same method.

Various aspects of the present invention are directed to providing a method for diagnosing and controlling a two-step exhaust variable valve lift (VVL) system, including: a controlling device acquiring an operation state signal of a vehicle to determine whether or not the vehicle is in an over-run state; when the vehicle is in the over-run state, the controlling device outputting a mode conversion signal of the two-step exhaust VVL system; an air mass sensor measuring an air mass entering an engine, and the controlling device comparing a predetermined prediction value of the air mass with the measured air mass; when a difference of the compared air mass corresponds to a predetermined mode conversion comparing amount, the controlling device determining that a mode conversion of the two-step exhaust VVL system is completed; and when the difference of the compared air mass does not correspond to the mode conversion comparing amount, the controlling device determining that the two-step exhaust VVL system is faulty and outputting a result thereof.

The method may further include a timer outputting a conversion delay time between an output time of a mode conversion signal and a mode conversion completion time of the two-step exhaust VVL system; and when the conversion delay time is a predetermined reference conversion delay time or more, the controlling device determining that the two-step exhaust VVL system is faulty and outputting a result thereof.

The method may further include when the conversion delay time is less than the reference conversion delay time, the controlling device storing the conversion delay time for each of corresponding driving conditions; and the controlling device performing a learning control by applying the stored conversion delay time.

The learning control may be performed by applying, the controlling device, the stored conversion delay time to operate an engine management system.

Various aspects of the present invention are directed to providing a vehicle provided with a method for diagnosing and controlling a two-step exhaust variable valve lift (VVL) system, including: an accelerator pedal sensor measuring an operation angle of an accelerator pedal and outputting a corresponding signal; a vehicle speed sensor measuring speed of the vehicle and outputting a corresponding signal; an air mass sensor measuring an air mass entering an engine; the two-step exhaust VVL system; a controlling device receiving vehicle state signals including the output signals of the accelerator pedal sensor and the vehicle speed sensor to determine whether or not the two-step exhaust VVL system enters a diagnosis mode and outputting a mode conversion signal of the two-step exhaust VVL system; a timer measuring a conversion delay time between an output time of the mode conversion signal and an operation completion time of the two-step exhaust VVL system; a memory storing the conversion delay time; and an engine management system operated over the stored conversion delay time by a control of the controlling device.

The controlling device may compare a signal output from the air mass sensor with a predetermined prediction value of the air mass, when a difference of the compared air mass corresponds to a predetermined mode conversion comparing amount, the controlling device may determine that a mode conversion of the two-step exhaust VVL system is completed, and when the difference of the compared air mass does not correspond to the mode conversion comparing amount, the controlling device may determine that the two-step exhaust VVL system is faulty and outputs a result thereof.

When the conversion delay time is a predetermined reference conversion delay time or more, the controlling device may determine that the two-step exhaust VVL system is faulty and output a result thereof.

When the conversion delay time is less than the reference conversion delay time, the controlling device may store the conversion delay time for each of corresponding driving conditions, and the controlling device may perform a learning control by applying the stored conversion delay time.

The learning control may be performed by applying, the controlling device, the stored conversion delay time to operate an engine management system.

According to an exemplary embodiment of the present invention, the method for diagnosing and controlling a two-step exhaust variable valve lift (VVL) system and the vehicle provided with the same method may determine whether or not the two-step exhaust VVL system is faulty without using a separate sensor.

In addition, a control of an engine management system (EMS) may be optimized by learning a conversion delay time of a valve lift, making it possible to suppress an occurrence of harmful exhaust gas.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a flowchart illustrating a method for diagnosing and controlling a two-step exhaust variable valve lift (VVL) system according to an exemplary embodiment of the present invention.

Figure 1:
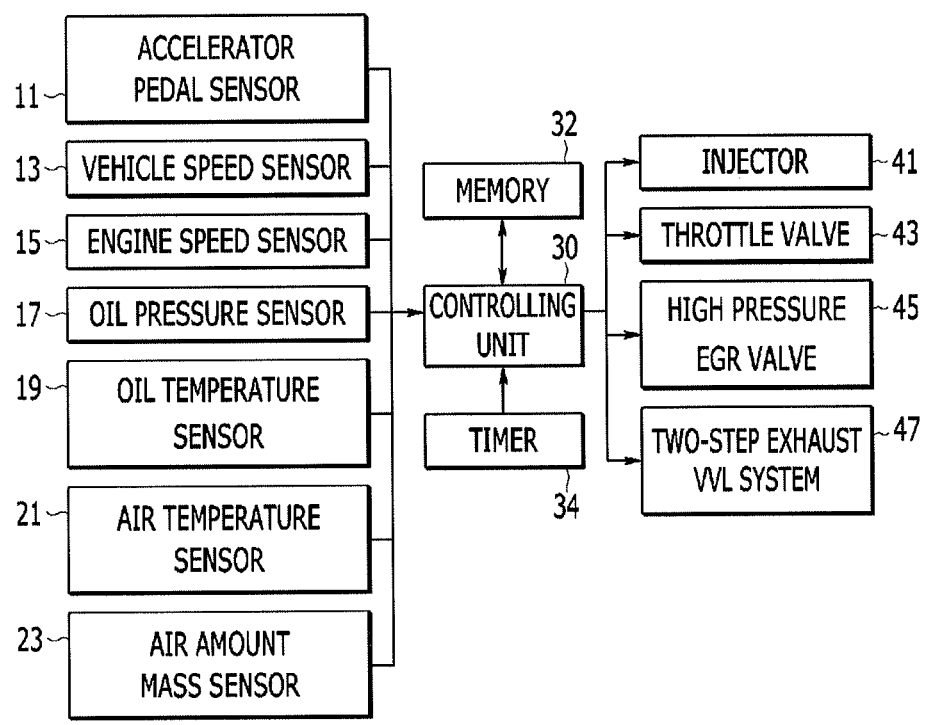
FIG. 1 is a block drawing illustrating a vehicle provided with a method for diagnosing and controlling a two-step exhaust variable valve lift (VVL) system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain example embodiments of the present invention have been shown and described, simply by way of illustration.

As those skilled in the art would realize, the described embodiments may be modified in various different ways, all without departing from the spirit or scope of the present invention Portions denoted by like reference numerals mean like elements throughout the specification.

Throughout the specification, unless explicitly described to the contrary, the word "comprise" and variations such as "comprises" or "comprising", will be understood to imply the inclusion of stated elements but not the exclusion of any other elements.

An example embodiment of the present invention will hereinafter be described in detail with reference to the accompanying drawings.

FIG. 1 is a block drawing illustrating a vehicle provided with a method for diagnosing and controlling a two-step exhaust variable valve lift (VVL) system according to an exemplary embodiment of the present invention.

Referring to FIG. 1, the vehicle provided with a method for diagnosing and controlling a two-step exhaust variable valve lift (VVL) system according to an exemplary embodiment of the present invention includes a plurality of vehicle state sensors measuring a state of the vehicle and outputting a corresponding signal.

The vehicle state sensors include, for example, an accelerator pedal sensor 11 measuring an operation angle of an accelerator pedal and outputting a corresponding signal, a vehicle speed sensor 13 measuring speed of the vehicle and outputting a corresponding signal, and an air mass sensor 23 (an air flow meter) measuring an air mass entering an engine. In addition, the vehicle state sensors may further include an engine speed sensor 15 measuring rotation speed of the engine and outputting a corresponding signal, an oil pressure sensor 17 measuring pressure of operation oil and outputting a corresponding signal, an oil temperature sensor 19 measuring a temperature of the operation oil and outputting a corresponding signal, and an air temperature sensor 21 measuring a temperature of air entering the engine and outputting a corresponding signal.

The vehicle provided with a method for diagnosing and controlling a two-step exhaust VVL system according to an exemplary embodiment of the present invention further includes a two-step exhaust VVL system 47, a controlling device 30, a timer 34, a memory 32, and an engine management system.

The controlling device 30 receives vehicle state signals including the output signals of the accelerator pedal sensor 11 and the vehicle speed sensor 13 to determine whether or not the two-step exhaust VVL system 47 enters a diagnosis mode and to control an operation of the two-step exhaust VVL system 47.

The timer 34 measures a conversion delay time between an operation start and an operation completion of the two-step exhaust VVL system 47 and outputs a corresponding signal.

The memory 32 stores the conversion delay time.

The engine management system may include, for example, an injector 41, a throttle valve 43, and a high pressure EGR valve 45, and the controlling device 30 applies the stored conversion delay time to the engine management system to control an operation of the engine management system.

Figure 2:
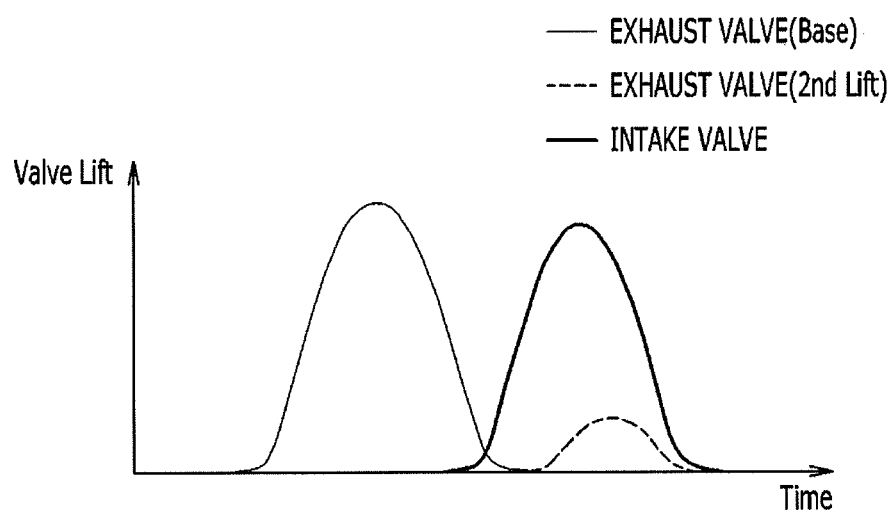
FIG. 2 is a graph illustrating a valve lift of an engine provided with the two-step exhaust VVL system according to an exemplary embodiment of the present invention.

FIG. 2 is a graph illustrating a valve lift of an engine provided with the two-step exhaust VVL system according to an exemplary embodiment of the present invention.

Referring to FIG. 2, the two-step exhaust VVL system generally means a system implementing a secondary ($2^{nd}$) lift of an exhaust valve during an intake stroke.

Since a general engine, particularly, a diesel engine including a turbo charger has shear pressure (exhaust side pressure) of the turbo charger which is relatively higher than intake manifold pressure (intake side pressure), exhaust gas flows into a cylinder when an exhaust valve is opened during the intake stroke.

Such two-step exhaust VVL system may directly supply the exhaust gas into the cylinder without passing through a separate EGR route.

To determine whether or not the valve lift of the two-step exhaust VVL system is converted, it is required to measure an actual valve lift, or to measure a behavior of a lock pin of the two-step exhaust VVL system. However, a technology of measuring the valve lift or the behavior of the lock pin in the engine which is being actually driven is not yet developed.

Figure 3:
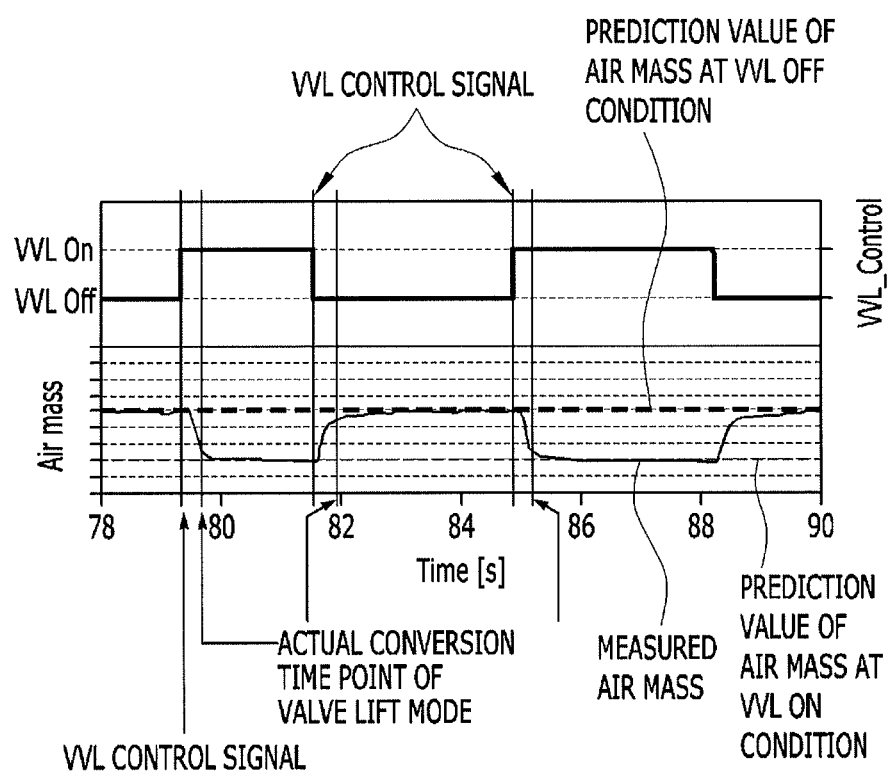
FIG. 3 is a graph illustrating an operation mode and an air mass of the two-step exhaust VVL system according to an exemplary embodiment of the present invention.

FIG. 3 is a graph illustrating an operation mode and an air mass of the two-step exhaust VVL system according to an exemplary embodiment of the present invention and FIG. 4 is a flowchart illustrating a method for diagnosing and controlling a two-step exhaust variable valve lift (VVL) system according to an exemplary embodiment of the present invention.

Hereinafter, a method for diagnosing and controlling a two-step exhaust VVL system according to an exemplary embodiment of the present invention will be described with reference to FIGS. 1 to 4.

The controlling device 30 acquires an operation state signal of a vehicle to determine whether or not the vehicle is in an over-run state (S10).

Here, the over-run state of the vehicle, which is a case in which the high pressure EGR valve 45 is closed during a driving of the vehicle and EGR is not supplied, may be, for example, a state in which the vehicle is decelerated because an accelerator pedal is not stepped on.

In the case in which the vehicle is in the over-run state, the controlling device 30 starts the diagnosis of the two-step exhaust VVL system 47 (S30).

First, the controlling device 30 outputs a mode conversion signal of the two-step exhaust VVL system 47 (S40), and the air mass sensor 23 measures an air mass entering the engine (S50).

The controlling device 30 compares a predetermined prediction value of the air mass with the measured air mass (S60), determines that the mode conversion of the two-step exhaust VVL system 47 is completed (S70) when a difference of the compared air mass corresponds to a predetermined mode conversion comparing amount, and determines that the two-step exhaust VVL system 47 is faulty and outputs a result thereof (S80) when the difference of the compared air mass does not correspond to the mode conversion comparing amount.

Referring to FIG. 3, in the case in which the two-step exhaust VVL system 47 performs the mode conversion, for example, in the case in which the two-step exhaust VVL system 47 is turned-on, the exhaust value is opened during the intake stroke, such that the exhaust gas flows into the cylinder, and as a result, the air mass entering the cylinder is decreased. In contrast, in the case in which the two-step exhaust VVL system 47 is turned-off, the air mass entering the cylinder is increased.

The controlling device 30 may compare the predetermined prediction value of the air mass with the measured actual air mass (S60) to determine whether or not the two-step exhaust VVL system 47 is actually operated, or stops the operation thereof.

That is, in a driving state of the over-run state of the vehicle, it is possible to determine whether or not the two-step exhaust VVL system 47 is normally operated through whether or not a flow of the air mass is changed in a state in which a change of the air mass is relatively small.

The predetermined prediction value of the air mass, which is a value by which it may be determined that the two-step exhaust VVL system 47 is normally operated, may be determined in advance by an experiment.

The timer 34 measures a time at which the controlling device 30 operates the two-step exhaust VVL system 47 and a time at which the mode conversion of the two-step exhaust VVL system 47 is completed, and outputs the conversion delay time (S90).

As illustrated in FIG. 3, a constant delay time exists between the time at which the controlling device 30 operates the two-step exhaust VVL system 47 and the time at which the mode conversion of the two-step exhaust VVL system 47 is completed, that is, a time at which the air mass measured by the air mass sensor 23 corresponds to a set range, and the timer 34 measures the conversion delay time and outputs a corresponding signal.

When the conversion delay time is a predetermined reference conversion delay time or more, the controlling device 30 determines that the two-step exhaust VVL system 47 is faulty and outputs a result thereof (S90). That is, when the conversion delay time is out of the set range, the controlling device 30 determines that the two-step exhaust VVL system 47 is not normally operated, and outputs a fault signal.

When the conversion delay time is less than the reference conversion delay time, that is, when it is determined that the two-step exhaust VVL system 47 is normally operated, that controlling device 30 stores the conversion delay time in the memory 32 for each of corresponding driving conditions (S110).

The corresponding driving condition means an operation state of the vehicle at an instant at which the conversion delay time is stored.

The controlling device 30 performs a learning control by applying the stored conversion delay time (S120).

The learning control is performed by applying, the controlling device 30, the stored conversion delay time to operate the engine management system.

That is, the controlling device 30 applies a mode conversion signal to the two-step exhaust VVL system 47 and then applies the conversion delay time at which an actual mode conversion is performed at control an operation of the injector 41, the throttle valve 43, or the like.

As described above, according to an exemplary embodiment of the present invention, the method for diagnosing and controlling a two-step exhaust variable valve lift (VVL) system and the vehicle provided with the same method may determine whether or not the two-step exhaust VVL system is faulty without using the separate sensor.

In addition, the control of an engine management system (EMS) may be optimized by learning the conversion delay time of the valve lift, making it possible to suppress an occurrence of harmful exhaust gas.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for diagnosing and controlling a two-step exhaust variable valve lift (VVL) system, the method comprising:
    acquiring, by a controller, an operation state signal of a vehicle to determine whether or not the vehicle is in an over-run state;
    when the vehicle is in the over-run state, outputting, by the controller, a mode conversion signal of the two-step exhaust VVL system;
    measuring, by an air mass sensor, an air mass entering an engine, and comparing by the controller, a predetermined prediction value of the air mass with the measured air mass;
    when a difference of a compared air mass corresponds to a predetermined mode conversion comparing amount, determining, by the controller, that a mode conversion of the two-step exhaust VVL system is completed; and
    when the difference of the compared air mass does not correspond to the mode conversion comparing amount, determining, by the controller, that the two-step exhaust WI, system is faulty and outputting, by the controller, a fault signal as a result thereof.

2. The method of claim 1, further including:
    outputting, by a timer, a conversion delay time between an output time of the mode conversion signal and a mode conversion completion time of the two-step exhaust VVL, system; and
    when the conversion delay time is equal to or greater than a predetermined reference conversion delay time, determining, by the controller, that the two-step exhaust VVL system is faulty and outputting a result thereof by the control.

3. The method of claim 2, further including:
    when the conversion delay time is less than the predetermined reference conversion delay time, storing, by the controller, the conversion delay time for each corresponding driving condition; and
    performing, by the controller, a learning control by applying the stored conversion delay time.

4. The method of claim 3, wherein the learning control is performed by the controller by applying the stored conversion delay time to operate an engine management system.

5. A vehicle provided with a two-step exhaust variable valve lift (VVL) system, the vehicle including:
    an accelerator pedal sensor measuring an operation angle of an accelerator pedal and outputting a corresponding signal;
    a vehicle speed sensor measuring speed of the vehicle and outputting a corresponding signal; and
    an air mass sensor measuring an air mass entering an engine,
    wherein the two-step exhaust VVL system includes:
    a controller receiving vehicle state signals including the corresponding signal of the accelerator pedal sensor and the vehicle speed sensor to determine whether or not the two-step exhaust VVL system enters a diagnosis mode and outputting a mode conversion signal of the two-step exhaust VVL system;
    a timer measuring a conversion delay time between an output time of the mode conversion signal and an operation completion time of the two-step exhaust VVL system;
    a memory storing the conversion delay time; and
    an engine management system operated over the stored conversion delay time by a control of the controller.

6. The vehicle of claim 5, wherein
    the controller is configured to compare a signal output from the air mass sensor with a predetermined prediction value of the air mass,
    when a difference of the compared air mass corresponds to a predetermined mode conversion comparing amount, the controller is configured to determine that a mode conversion of the two-step exhaust VVL system is completed, and
    when the difference of the compared air mass does not correspond to the mode conversion comparing amount, the controller is configured to determine that the two-step exhaust VVL system is faulty and outputs a fault signal as a result thereof.

7. The vehicle of claim 6, wherein
    when the conversion delay time is equal to or greater than a predetermined reference conversion delay time, the controller is configured to determine that the two-step exhaust VVL system is faulty and outputs the result thereof by the controller.

8. The vehicle of claim 6, wherein
    when the conversion delay time is less than the predetermined reference conversion delay time, the controller stores the conversion delay time for each corresponding driving condition, and
    the controller performs a learning control by applying the stored conversion delay time.

9. The vehicle of claim 8, wherein
    the learning control is performed by the controller by applying the stored conversion delay time to operate the engine management system.

* * * * *